United States Patent
Nakagawa et al.

(10) Patent No.: US 9,143,242 B2
(45) Date of Patent: Sep. 22, 2015

(54) OPTICAL SIGNAL DEMODULATOR, OPTICAL SIGNAL DEMODULATING METHOD, AND OPTICAL ADD-DROP MULTIPLEXER

(71) Applicant: FUJITSU LIMITED, Kawasaki-shi, Kanagawa (JP)

(72) Inventors: Goji Nakagawa, Sagamihara (JP); Kyosuke Sone, Kawasaki (JP); Shoichiro Oda, Fuchu (JP); Yasuhiko Aoki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 14/065,999

(22) Filed: Oct. 29, 2013

(65) Prior Publication Data

US 2014/0270781 A1   Sep. 18, 2014

(30) Foreign Application Priority Data

Mar. 15, 2013  (JP) ................................ 2013-054332

(51) Int. Cl.
*H04J 14/02*   (2006.01)
*H04B 10/06*   (2006.01)
*H04B 10/60*   (2013.01)
*H04B 10/67*   (2013.01)

(52) U.S. Cl.
CPC ............. *H04B 10/60* (2013.01); *H04B 10/675* (2013.01); *H04J 14/0201* (2013.01); *H04B 2210/074* (2013.01)

(58) Field of Classification Search
CPC ................ H04B 10/60; H04B 10/675; H04B 2210/074; H04J 14/0201
USPC ........................ 398/83, 202, 85, 26, 196, 213
See application file for complete search history.

(56) References Cited

U.S. PATENT DOCUMENTS

| | | | | |
|---|---|---|---|---|
| 5,285,059 | A * | 2/1994 | Nakata et al. | 250/205 |
| 5,521,754 | A * | 5/1996 | Nitta et al. | 359/344 |
| 7,039,319 | B1 * | 5/2006 | Moulton et al. | 398/95 |
| 2002/0130256 | A1 | 9/2002 | Macki et al. | |
| 2002/0176457 | A1 * | 11/2002 | DeCusatis et al. | 372/26 |
| 2003/0123782 | A1 * | 7/2003 | Miyata et al. | 385/15 |
| 2003/0179988 | A1 * | 9/2003 | Kai et al. | 385/24 |
| 2004/0136728 | A1 * | 7/2004 | Sekiya et al. | 398/177 |

(Continued)

FOREIGN PATENT DOCUMENTS

EP   0 591 866 A2   4/1994

OTHER PUBLICATIONS

Extended European Search Report issued Jul. 10, 2014 in corresponding European Patent Application No. 13190668.7.
Takahito Tanimura et al.,"In-Band FSK Supervisory Signaling Between Adaptive Optical Transceivers Employing Digital Signal Processing", ECOC Technical Digest 2011, Optical Society of America, Sep. 2011.

(Continued)

*Primary Examiner* — Ken Vanderpuye
*Assistant Examiner* — Abbas H Alagheband
(74) *Attorney, Agent, or Firm* — Staas & Halsey LLP

(57) ABSTRACT

An optical signal demodulator includes: an obtaining unit configured to obtain a spectrum of an optical signal generated by a second signal being superimposed on a first signal using frequency modulation; an identifying unit configured to identify a peak wavelength which is a wavelength corresponding to a peak position of the spectrum; and a demodulating unit configured to demodulate the second signal from the optical signal using a wavelength-variable filter to which a transmitted wavelength band has been set based on the peak wavelength.

15 Claims, 14 Drawing Sheets

(56) References Cited

U.S. PATENT DOCUMENTS

| | | | |
|---|---|---|---|
| 2004/0197099 A1* | 10/2004 | Kai et al. | 398/85 |
| 2005/0169633 A1* | 8/2005 | Nakagawa et al. | 398/85 |
| 2007/0268552 A1* | 11/2007 | Takita | 359/285 |
| 2009/0080882 A1* | 3/2009 | Cahill | 398/26 |
| 2010/0148675 A1* | 6/2010 | Meijer et al. | 315/152 |
| 2011/0311222 A1* | 12/2011 | Nakamura et al. | 398/26 |
| 2012/0128359 A1* | 5/2012 | Mazzone et al. | 398/67 |
| 2012/0170926 A1* | 7/2012 | Van Leeuwen | 398/9 |
| 2012/0328297 A1* | 12/2012 | Hoshida | 398/85 |
| 2013/0251365 A1* | 9/2013 | Sone et al. | 398/38 |

OTHER PUBLICATIONS

Takahito Tanimura et al., "Superimposition and Detection of Frequency Modulated Tone for Light Path Tracing Employing Digital Signal Processing and Optical Filter", OFC/NFOEC Technical Digest 2012, Optical Society of America, Mar. 2012.

Goji Nakagawa et al., "Evaluation of FSK Light Labels Superimposed on 112 Gbps DP-QPSK Signal with Real-time Coherent Receiver and Optical Filter Based Decoder for Light Path Tracing" OFC/NFOEC Technical Digest, Optical Society of America, 2013.

* cited by examiner

OPTICAL SIGNAL DEMODULATOR, OPTICAL SIGNAL DEMODULATING METHOD, AND OPTICAL ADD-DROP MULTIPLEXER

CROSS-REFERENCE TO RELATED APPLICATION

This application is based upon and claims the benefit of priority of the prior Japanese Patent Application No. 2013-054332, filed on Mar. 15, 2013, the entire contents of which are incorporated herein by reference.

FIELD

The embodiments discussed herein are related to an optical signal demodulator, an optical signal demodulating method, an optical signal demodulating program, and an optical add-drop multiplexer.

BACKGROUND

With an optical network employing optical branching/insertion or optical cross connection or the like, a great number of optical paths are set between multiple transmission nodes and multiple reception nodes. Therefore, multiple optical signals having mutually different combinations of transmission node and reception node may be transmitted using the same wavelength. Accordingly, it is difficult for a reception node to determine, just by detecting the wavelength of a received optical signal, whether or not the optical signal thereof has been transmitted from a desired transmission node, that is, whether or not the received optical signal is a desired optical signal.

Therefore, in order to enable a reception node to confirm a transmission source of the received optical signal, a node ID that indicates which transmission node a principal signal has been transmitted from may be superimposed on a principal signal thereof as an auxiliary signal. Also, in order to enable a relay node to identify which path is an optical path where the optical signal is transmitted from, the path ID of the optical path may be superimposed on the principal signal as the auxiliary signal.

As a technique to superimpose an auxiliary signal on a principal signal, there is a technique to superimpose an auxiliary signal on a principal signal using frequency modulation, that is, to subject a principal signal to frequency modulation using an auxiliary signal. More specifically, with this technique, a center frequency of the principal signal is slightly changed by "−Δf" or "+Δf" in response to "0" or "1" of digital information of the auxiliary signal. For example, in the event that a transmission frequency band width of the principal signal is several tens of GHz, the magnitude of Δf is around 0.1 to 0.5 GHz. At a reception node or relay node, a received optical signal is subjected to filtering using a wavelength filter, transmitted light after filtering is received at a photodiode to convert this into an electric signal, thereby converting the auxiliary signal superimposed on the principal signal into an intensity modulated signal. Specifically, the auxiliary signal superimposed on the principal signal by frequency modulation of ±Δf is detected by the filtering at the wavelength filter as a signal of which the intensity is changed by the worth according to ±Δf. In this manner, at a reception node or relay node, of the principal signal and auxiliary signal included in the optical signal, even without demodulating the principal signal, the auxiliary signal alone is demodulated.

The following non-patent literatures are examples of the related art of the present disclosure.

Tanimura, Takahito; Hoshida, Takeshi; Nakashima, Hisao; Akiyama, Yuichi; Yan, Meng; Tao, Zhenning; Rasmussen, Jens C., "In-Band FSK Supervisory Signaling Between Adaptive Optical Transceivers Employing Digital Signal Processing", in Proceeding of ECOC 2011, We.7.A, September 2011.

Tanimura, Takahito; Hoshida, Takeshi; Oda, Shoichiro; Akiyama, Yuichi; Nakashima, Hisao; Aoki, Yasuhiko; Cao, Yinwen; Yan, Meng; Tao, Zhenning; Rasmussen, Jens C., "Superimposition and Detection of Frequency Modulated Tone for Light Path Tracing Employing Digital Signal Processing and Optical Filter", in Proceeding of OFC 2012, OW4G.4, March 2012.

In order to demodulate the auxiliary signal superimposed on the principal signal by frequency modulation using a wavelength filter as described above, it is desirable to set near the center frequency of the principal signal, that is, near the center wavelength of the principal signal as the center wavelength of the wavelength filter.

However, in the event that precision of a light-emitting element that a transmission node includes to generate the principal signal is inferior, or the like, the center wavelength of the principal signal may be inaccurate by involuntarily deviating from a nominal wavelength. Also, the center wavelength of a laser diode to be sometimes used as a light-emitting element included in a transmission node is shifted to a long wavelength side as operation temperature thereof increases. Therefore, along with increase in operation temperature of the laser diode, the center wavelength of the principal signal involuntarily deviates from a nominal wavelength.

According to the center wavelength of the principal signal involuntarily deviating from a nominal wavelength, it becomes difficult to fixedly set the optimal position on the wavelength axis of the wavelength filter as to the principal signal. Therefore, heretofore, demodulation precision of the auxiliary signal superimposed on the principal signal by frequency modulation has sometimes deteriorated.

SUMMARY

According to an aspect of the embodiment, an optical signal demodulator includes: an obtaining unit configured to obtain a spectrum of an optical signal generated by a second signal being superimposed on a first signal using frequency modulation; an identifying unit configured to identify a peak wavelength which is a wavelength corresponding to a peak position of the spectrum; and a demodulating unit configured to demodulate the second signal from the optical signal using a wavelength-variable filter to which a transmitted wavelength band has been set based on the peak wavelength.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
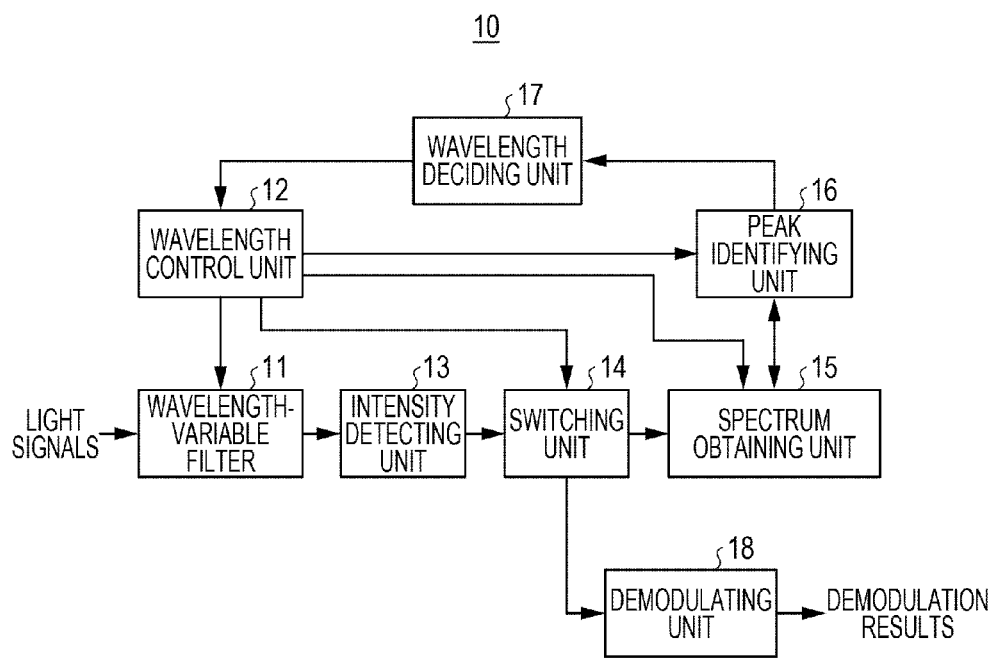
FIG. 1 is a functional block diagram illustrating an example of an optical signal demodulator in a first embodiment.

Hereinafter, embodiments of an optical signal demodulator, an optical signal demodulating method, an optical signal demodulating program, and an optical add-drop multiplexer disclosed in the present application will be described in detail based on the appended drawings. Note that an optical signal demodulator, an optical signal demodulating method, an optical signal demodulating program, and an optical add-drop multiplexer disclosed in the present application are not restricted to the following embodiments. Also, a configuration having the same function in the embodiments, and an operation for performing the same processing are denoted with the same reference numeral, and redundant description will be omitted.

FIG. 1 is a functional block diagram illustrating an example of an optical signal demodulator in a first embodiment. In FIG. 1, an optical signal demodulator 10 includes a wavelength-variable filter 11, a wavelength control unit 12, an intensity detecting unit 13, a switching unit 14, a spectrum obtaining unit 15, a peak identifying unit 16, a wavelength deciding unit 17, and a demodulating unit 18.

Input to the wavelength-variable filter 11 is an optical signal received from a transmission node or relay node. This optical signal is a signal generated by an auxiliary signal being superimposed on a principal signal by frequency modulation at a transmission node. Specifically, a transmission node superimposes, as described above, the auxiliary signal on the principal signal by slightly changing the center frequency of the principal signal by "$-\Delta f$" or "$+\Delta f$" in response to "0" or "1" of digital information of the auxiliary signal. Also, the auxiliary signal includes, as described above, information for management of an optical network, such as a node ID or path ID or the like.

The wavelength-variable filter 11 has a fixed transmitted wavelength band width. Also, the wavelength-variable filter 11 performs filtering wherein the wavelength-variable filter 11 changes the transmitted wavelength band by its center wavelength being controlled by the wavelength control unit 12 to transmit light with some wavelength of the input optical signal. The wavelength-variable filter 11 outputs transmitted light after the filtering to the intensity detecting unit 13.

The wavelength control unit 12 controls, as will be described later, the center wavelength of the wavelength-variable filter 11. Also, the wavelength control unit 12 controls, as will be described later, the switching unit 14. Also, the wavelength control unit 12 performs notification, such as described later, on the spectrum obtaining unit 15 and peak identifying unit 16.

The intensity detecting unit 13 includes a photodiode as a light-receiving element for example, receives the transmitted light of the wavelength-variable filter 11, and converts the transmitted light thereof into an electric signal, thereby detecting an intensity of the transmitted light. The intensity detecting unit 13 outputs the detection result of the intensity of the transmitted light to the switching unit 14.

The switching unit 14 switches an output destination of the detection result input from the intensity detecting unit 13 to either the spectrum obtaining unit 15 or demodulating unit 18 in accordance with control from the wavelength control unit 12.

The spectrum obtaining unit 15 measures and obtains a spectrum of the optical signal input to the wavelength-variable filter 11 based on the detection result input from the switching unit 14, that is, an intensity of the transmitted light of the wavelength-variable filter 11.

The peak identifying unit 16 references the spectrum obtained at the spectrum obtaining unit 15 in accordance with an instruction from the wavelength control unit 12. The peak identifying unit 16 identifies a peak position of the spectrum obtained at the spectrum obtaining unit 15, and also identifies a peak wavelength which is a wavelength corresponding to the peak position thereof on the wavelength axis, and informs the identified peak wavelength to the wavelength deciding unit 17.

The wavelength deciding unit 17 decides a wavelength to be demodulated of the auxiliary signal (hereinafter, also referred to as "wavelength to be demodulated") with the peak wavelength informed from the peak identifying unit 16 as a reference, and informs the decided wavelength to be demodulated to the wavelength control unit 12.

The demodulating unit 18 demodulates the auxiliary signal based on the detection result input from the switching unit 14, that is, an intensity of the transmitted light of the wavelength-variable filter 11, and outputs demodulation results.

Figure 2:
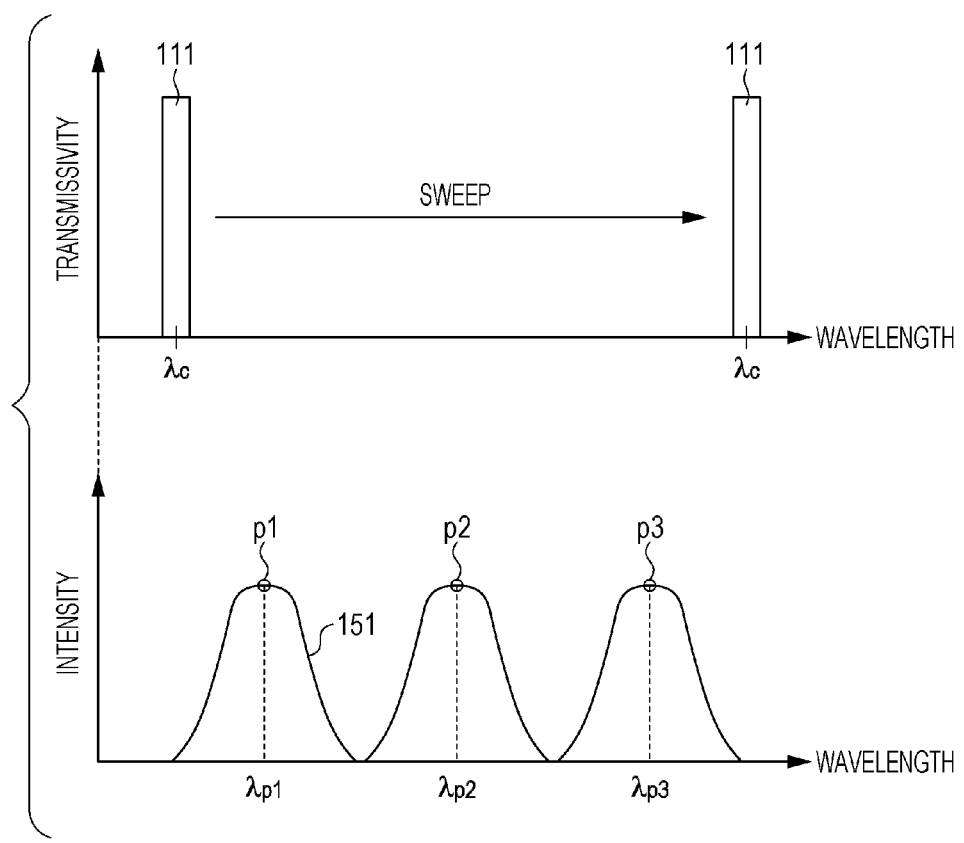
FIG. 2 is a diagram for describing processing of the optical signal demodulator in the first embodiment.
Figure 3:
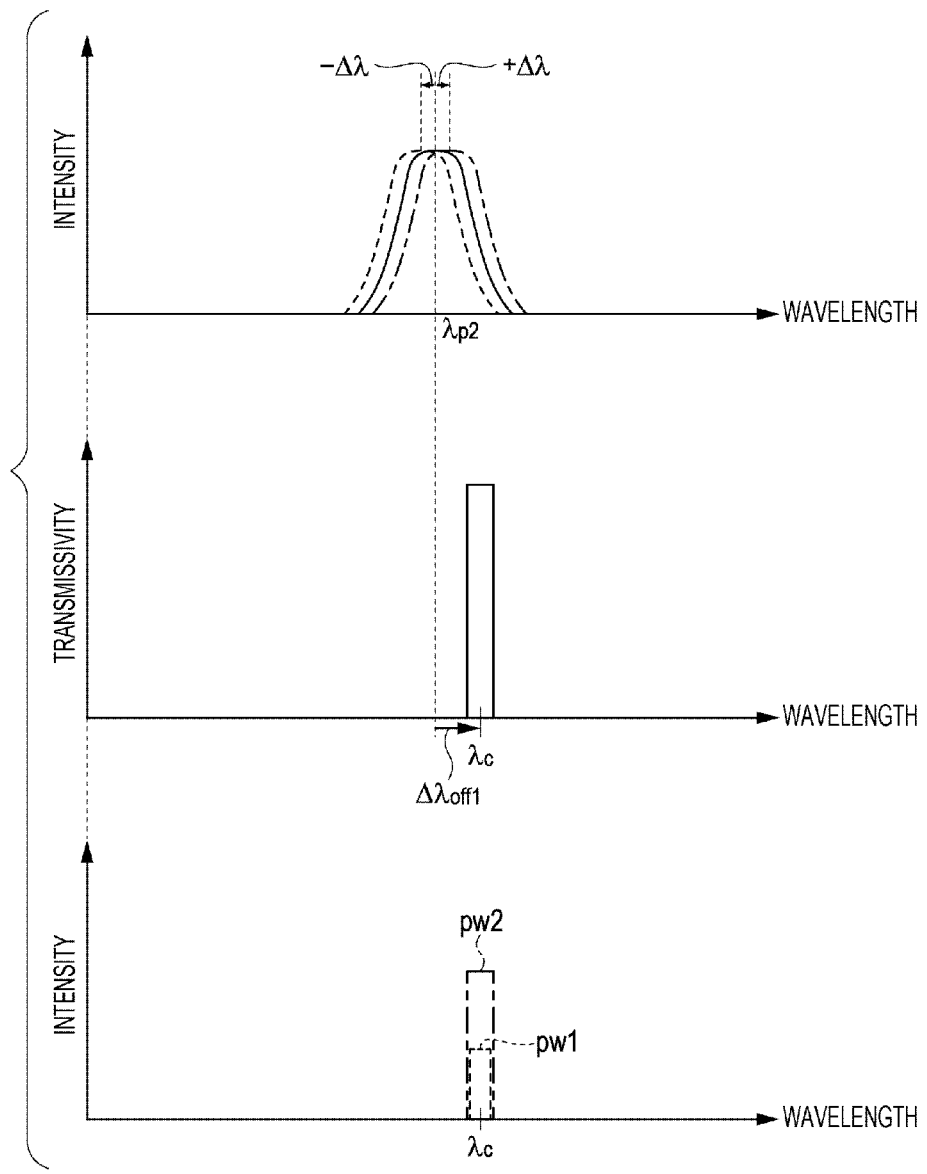
FIG. 3 is a diagram for describing the processing of the optical signal demodulator in the first embodiment.

FIG. 2 and FIG. 3 are diagrams for describing processing of the optical signal demodulator 10 in the first embodiment.

As illustrated in FIG. 2, the wavelength control unit 12 performs sweep processing wherein the wavelength control unit 12 sweeps a transmitted wavelength band 111 of the wavelength-variable filter 11 on the wavelength axis by sequentially shifting the center wavelength $\lambda_c$ of the wavelength-variable filter 11 on the wavelength axis. The wavelength control unit 12 performs this sweep processing across a wavelength band usable for transmission of an optical signal in an optical network system to which the optical signal demodulator 10 is applied, that is, across the entire area of the transmission wavelength band of the optical signal. Also, the wavelength control unit 12 sequentially shifts the center wavelength $\lambda_c$ of the wavelength-variable filter 11 with a predetermined wavelength interval, and informs the wavelength of each shift point to the spectrum obtaining unit 15. The wavelength-variable filter 11 subjects the input optical signal to filtering while the center wavelength $\lambda_c$ is being sequentially shifted. Thus, the intensity detecting unit 13 detects intensities of the optical signal with a predetermined wavelength interval across the entire area of the transmission wavelength band. At the time of start of the sweep processing, the wavelength control unit 12 sets the spectrum obtaining unit 15 side as an output destination of the switching unit 14, and accordingly, intensities of the optical signal detected by the sweep processing are sequentially input to the spectrum obtaining unit 15 along with the sweep processing. The spectrum obtaining unit 15 stores each intensity of the optical signals detected by the sweep processing in a manner correlated with each shift point of the center wavelength $\lambda_c$ of the wavelength-variable filter 11.

Accordingly, at the time of completion of the sweep processing, intensities of the optical signal across the entire area of the transmission wavelength band have been stored, and the spectrum obtaining unit 15 measures and obtains, for example, a spectrum 151 as illustrated in FIG. 2 from change in the stored intensities. Note that, FIG. 2 illustrates, as an example, a case where the optical signal input to the wavelength-variable filter 11 is light obtained by three optical signals having a mutually different wavelength being multiplexed by wavelength division multiplexing (WDM).

The wavelength control unit 12 switches, after completion of the sweep processing, the output destination of the switching unit 14 to the demodulating unit 18 side, and also outputs a completion notification of the sweep processing to the peak identifying unit 16 as a start instruction of peak identifying processing.

When receiving a completion notification of the sweep processing from the wavelength control unit 12, the peak identifying unit 16 references the spectrum 151 obtained at the spectrum obtaining unit 15. For example, as illustrated in FIG. 2, the peak identifying unit 16 identifies peak positions p1, p2, and p3 of the spectrum 151, and also identifies peak wavelengths $\lambda_{p1}$, $\lambda_{p2}$, and $\lambda_{p3}$ which are wavelengths corresponding to these peak positions p1, p2, and p3 on the wavelength axis, respectively. The peak identifying unit 16 informs the identified peak wavelengths $\lambda_{p1}$, $\lambda_{p2}$, and $\lambda_{p3}$ to the wavelength deciding unit 17.

The wavelength deciding unit 17 which has received the notification of the peak wavelengths $\lambda_{p1}$, $\lambda_{p2}$, and $\lambda_{p3}$ decides a wavelength to be demodulated with the peak wavelengths $\lambda_{p1}$, $\lambda_{p2}$, and $\lambda_{p3}$ as a reference. For example, in the event that the auxiliary signal superimposed on the principal signal having the peak position p2 is an object to be demodulated, the wavelength deciding unit 17 decides, as illustrated in FIG. 3, a wavelength position that has been offset from the peak wavelength $\lambda_{p2}$ by predetermined amount $+\Delta\lambda_{off1}$ as a wavelength to be demodulated with the peak wavelength $\lambda_{p2}$ as a reference. The wavelength deciding unit 17 then informs the determined wavelength to be demodulated "$\lambda_{p2}+\Delta\lambda_{off1}$" to the wavelength control unit 12.

The wavelength control unit 12 moves the center wavelength $\lambda_c$ of the wavelength-variable filter 11 to "$\lambda_{p2}+\Delta\lambda_{off1}$" which is the wavelength to be demodulated decided by the wavelength deciding unit 17, and fixes this. The wavelength-variable filter 11 of which the center wavelength $\lambda_c$ has been fixed to "$\lambda_{p2}+\Delta\lambda_{off1}$" subjects the input optical signal to filtering.

The principal signal is a signal subjected to frequency modulation using the auxiliary signal as described above. Accordingly, in response to the center frequency of the principal signal having the peak position p2 being changed by "$-\Delta f$" or "$+\Delta f$" over time, as illustrated in FIG. 3, the center wavelength of the principal signal is changed by "$-\Delta f$" or "$+\Delta f$" over time. The magnitudes of "$-\Delta\lambda$" and "$+\Delta\lambda$" correspond to the magnitudes of "$-\Delta f$" or "$+\Delta f$". The wavelength-variable filter 11 then subjects the principal signal of which the center wavelength is changed by "$-\Delta\lambda$" and "$+\Delta\lambda$" to filtering. Therefore, when fixing the center wavelength $\lambda_c$ of the wavelength-variable filter 11 to a wavelength position that has been offset from the peak wavelength $\lambda_{p2}$ by predetermined amount $+\Delta\lambda_{off1}$, as illustrated in FIG. 3, an intensity pw1 is detected at the intensity detecting unit 13 as an intensity of the principal signal changed by $-\Delta\lambda$. Also, similarly, at the intensity detecting unit 13, as illustrated in FIG. 3, an intensity pw2 greater than the intensity pw1 is detected as an intensity of the principal signal changed by $+\Delta\lambda$. In this manner, the auxiliary signal superimposed on the principal signal by frequency modulation of $\pm\Delta f$ is detected by the filtering at the wavelength-variable filter 11 as a signal of which the intensity is changed by the worth according to $\pm\Delta f$. That is to say, at the intensity detecting unit 13, the auxiliary signal superimposed on the principal signal by frequency modulation is converted into an intensity modulated signal. At this time, the output destination of the switching unit 14 is set to the demodulating unit 18 side, and accordingly, the intensities pw1 and pw2 sequentially detected by the intensity detecting unit 13 over time are input to the demodulating unit 18.

The demodulating unit 18 demodulates the auxiliary signal based on the intensities pw1 and pw2. The magnitudes of the intensities pw1 and pw2 correspond to the magnitudes of $-\Delta\lambda$ and $+\Delta\lambda$, respectively. Also, the magnitudes of $-\Delta\lambda$ and $+\Delta\lambda$ correspond to the magnitudes of $-\Delta f$ and $+\Delta f$, respectively. Also, $-\Delta f$ and $+\Delta f$ correspond to "0" and "1" of the digital information of the auxiliary signal, as described above, respectively. Therefore, the demodulating unit 18 demodulates the auxiliary signal with the intensity pw1 as information of "0" and with the intensity pw2 as information of "1", and outputs demodulation results made up of a bit string of "0" and "1". In this manner, demodulation of the auxiliary signal is performed with the wavelength to be demodulated decided by the wavelength deciding unit 17 with the peak wavelength $\lambda_{p2}$ as a reference. That is to say, the demodulating unit 18 demodulates the auxiliary signal using the transmitted light of the wavelength-variable filter 11 of which the center wavelength $\lambda_c$ has been fixed to "$\lambda_{p2}+\Delta\lambda_{off1}$". Also, the demodulation results output from the demodulating unit 18 include information for management of an optical network such as a node ID or path ID or the like represented with a bit string of "0" and "1".

Figure 4:
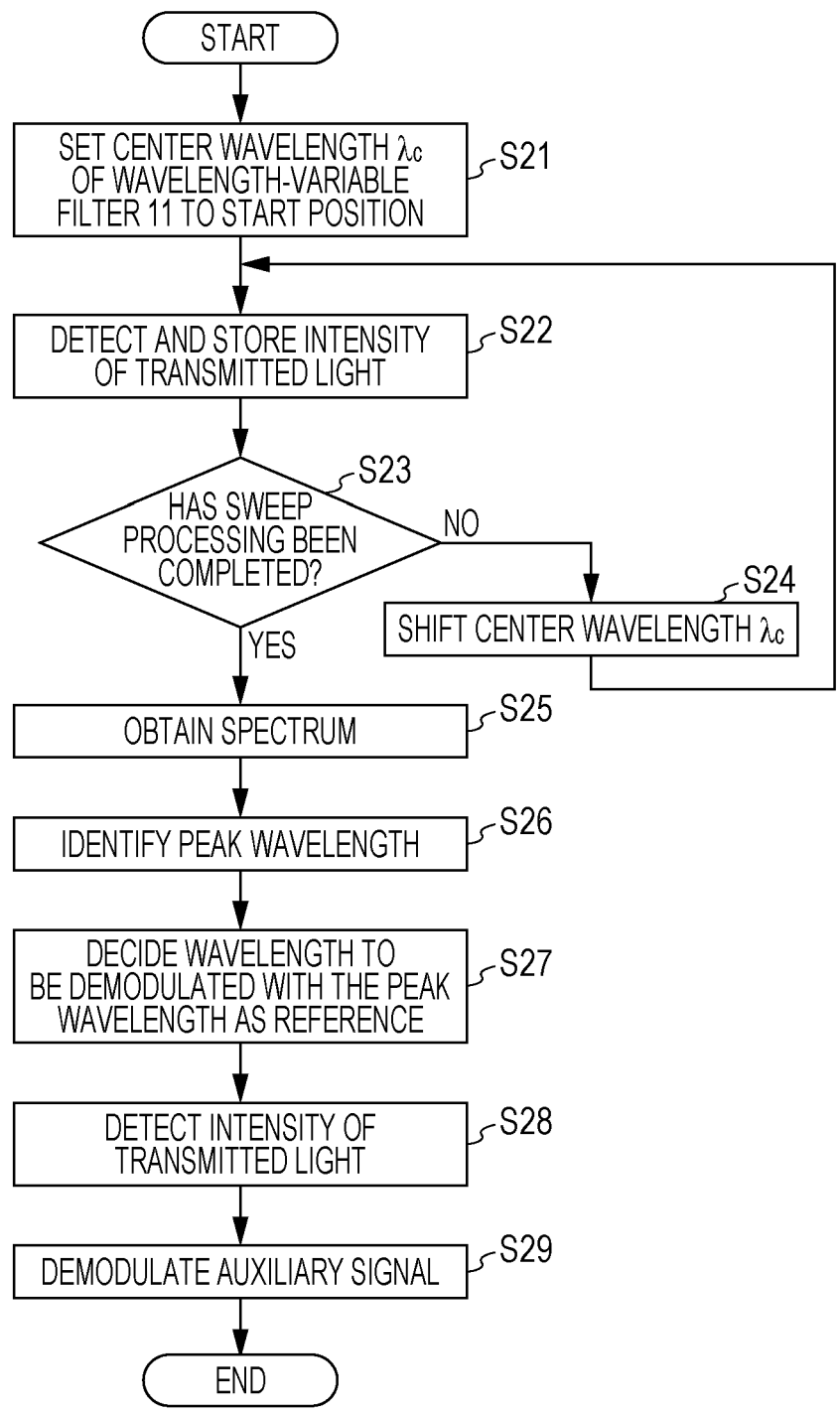
FIG. 4 is a flowchart for describing the processing of the optical signal demodulator in the first embodiment.

A flow of the above series of processing may be illustrated as follows. FIG. 4 is a flowchart for describing processing of the optical signal demodulator 10 in the first embodiment.

First, the wavelength control unit 12 sets the center wavelength $\lambda_c$ of the wavelength-variable filter 11 as a start position on the wavelength axis (operation S21). This start position is a wavelength serving as the origin of the sweep processing. Accordingly, it is desirable to set the shortest wavelength within the transmission wavelength band of the optical signal as the start position.

Next, the intensity detecting unit 13 detects an intensity of the transmitted light of the wavelength-variable filter 11, and the spectrum obtaining unit 15 stores the intensity detected by the intensity detecting unit 13 (operation S22).

Next, the wavelength control unit 12 determines whether to have swept the center wavelength $\lambda_c$ of the wavelength-variable filter 11 across the entire area of the transmission wavelength band of the optical signal, that is, whether or not the sweep processing has been completed (operation S23).

In the event that the sweep processing has not been completed (No in operation S23), the wavelength control unit 12 shifts the center wavelength $\lambda_c$ of the wavelength-variable filter 11 on the wavelength axis by predetermined amount (operation S24), and the processing returns to operation S22. The processing in operations S22 to S24 is repeatedly performed until the sweep processing is completed.

At the time of completion of the sweep processing, intensities of the optical signal across the entire area of the transmission wavelength band have been stored in the spectrum obtaining unit 15. In the event that the sweep processing has been completed (Yes in operation S23), the peak identifying unit 16 measures and obtains a spectrum from change in the stored intensities (operation S25).

Next, the peak identifying unit 16 identifies a peak position of the spectrum, and also identifies a peak wavelength corresponding to the peak position thereof on the wavelength axis (operation S26).

Next, the wavelength deciding unit 17 decides a wavelength to be demodulated with the peak wavelength as a reference, and the wavelength control unit 12 fixes the center wavelength $\lambda_c$ of the wavelength-variable filter 11 to the wavelength to be demodulated (operation S27).

Next, the intensity detecting unit 13 detects an intensity of the transmitted light of the wavelength-variable filter 11 of which the center wavelength $\lambda_c$ has been fixed to the wavelength to be demodulated (operation S28). The Intensity detection result in operation S28 is input to the demodulating unit 18.

Next, the demodulating unit 18 demodulates the auxiliary signal based on the intensity detected in operation S28 (operation S29).

As described above, according to the first embodiment, at the optical signal demodulator 10, the spectrum obtaining unit 15 obtains a spectrum of the optical signal generated by the auxiliary signal being superimposed on the principal signal by frequency modulation. The peak identifying unit 16 identifies a peak wavelength which is a wavelength corresponding to the peak position of the spectrum obtained by the spectrum obtaining unit 15, on the wavelength axis. The wavelength deciding unit 17 decides a wavelength to be demodulated with the peak wavelength identified by the peak identifying unit 16 as a reference. The demodulating unit 18 demodulates the auxiliary signal with the wavelength to be demodulated of the optical signal decided by the wavelength deciding unit 17 with the peak wavelength determined by the peak identifying unit 16 as a reference. Thus, the peak wavelength of the spectrum is usually equal to the center wavelength of the principal signal, and accordingly, even when the center wavelength of the principal signal deviates from a nominal wavelength, the wavelength to be demodulated may be adjusted by being changed according to the deviation thereof, and the optimal wavelength position is decided for the wavelength to be demodulated. Accordingly, demodulation precision of the auxiliary signal superimposed on the principal signal by frequency modulation is improved. Also, the wavelength to be demodulated is decided with the peak wavelength identified by the peak identifying unit 16 as a reference, and accordingly, the auxiliary signal is demodulated even when the nominal wavelength of the principal signal is unknown.

Also, the intensity detecting unit 13 detects an intensity of the transmitted light of the wavelength-variable filter 11. The wavelength control unit 12 performs sweep processing wherein the transmitted wavelength band of the wavelength-variable filter 11 is swept on the wavelength axis to have the spectrum obtaining unit 15 obtain a spectrum. On the other hand, the wavelength control unit 12 fixes the center wavelength of the wavelength-variable filter 11 to the wavelength to be demodulated, after completion of the sweep processing. The demodulating unit 18 demodulates the auxiliary signal based on the intensity of the transmitted light of the wavelength-variable filter 11 of which the center wavelength has been fixed to the wavelength to be demodulated. Thus, the auxiliary signal superimposed on the principal signal by frequency modulation is converted into an intensity modulated signal, and accordingly, the auxiliary signal is demodulated with relatively simple processing such as filtering by the wavelength-variable filter 11, and intensity detection by the intensity detecting unit 13.

Also, the wavelength deciding unit 17 decides a wavelength position that has been offset from the peak wavelength identified by the peak identifying unit 16 by predetermined amount as the wavelength to be demodulated. Thus, width of change in the intensity of the auxiliary signal converted into the intensity modulated signal increases, and accordingly, demodulation sensitivity of the auxiliary signal is improved.

Also, the wavelength-variable filter 11 subjects the optical signal to filtering in both at the time of obtaining a spectrum by the spectrum obtaining unit 15 and at the time of demodulating the auxiliary signal by the demodulating unit 18. Similarly, the intensity detecting unit 13 detects an intensity of the transmitted light of the wavelength-variable filter 11 in both at the time of obtaining a spectrum by the spectrum obtaining unit 15 and at the time of demodulating the auxiliary signal by the demodulating unit 18. That is to say, the wavelength-variable filter 11 is shared in both of for obtaining a spectrum and for demodulating the auxiliary signal. Similarly, the intensity detecting unit 13 is shared in both of for obtaining a spectrum and for demodulating the auxiliary signal. In this manner, one optical component is shared for multiple usages, thereby reducing the number of optical components included in the optical signal demodulator 10.

Also, the wavelength-variable filter 11 and intensity detecting unit 13 are also provided to an existing optical channel monitor (OCM). Therefore, the wavelength-variable filter 11 and intensity detecting unit 13 are shared between the optical channel monitor and the optical signal demodulator 10. Thus, in order to realize the optical signal demodulator 10, additional optical components are not used. Accordingly, it is desirable to implement the first embodiment by combing an existing optical channel monitor and the optical signal demodulator 10.

Also, with an existing optical channel monitor, intensity detection of each optical channel is performed using the wavelength-variable filter 11 and intensity detecting unit 13. Therefore, the first embodiment is implemented by combining an existing optical channel monitor and the optical signal demodulator 10, thereby performing intensity detection of an optical channel by the optical channel monitor and intensity detection for obtaining a spectrum by the optical signal demodulator 10 at the same time. That is to say, part of processing to be performed at the optical signal demodulator 10, and part of processing to be performed at the existing optical channel monitor are overlapped. Accordingly, both are effectively operated by combining the existing optical channel monitor and optical signal demodulator 10 to implement the first embodiment.

Also, with the first embodiment, obtaining of a spectrum is performed by the sweep processing of the wavelength-variable filter 11, and after obtaining of a spectrum, the center wavelength of the wavelength-variable filter 11 is fixed to the wavelength to be demodulated, thereby performing intensity detection for demodulating the auxiliary signal. Also, even with the existing optical channel monitor, the sweep processing of the wavelength-variable filter 11 is performed. Therefore, in the event of implementing the first embodiment by combining the existing optical channel monitor and optical signal demodulator 10, the sweep processing for the optical channel monitor and the sweep processing for the optical signal demodulator 10 are performed at the same time. On the other hand, intensity detection for demodulating the auxiliary signal is performed separately from the sweep processing. Therefore, with the first embodiment, at the time of performing intensity detection for demodulating the auxiliary signal, the center wavelength of the wavelength-variable filter 11 is fixed to the wavelength to be demodulated for a long time, and accordingly, the intensity detecting unit 13 detects an intensity of the optical signal with the same wavelength for many hours. Accordingly, the first embodiment is an effective embodiment in the even that information volume of the auxiliary signal is relatively large.

With a second embodiment, a peak wavelength is identified based on frequency components of an intensity of an optical signal.

Figure 5:
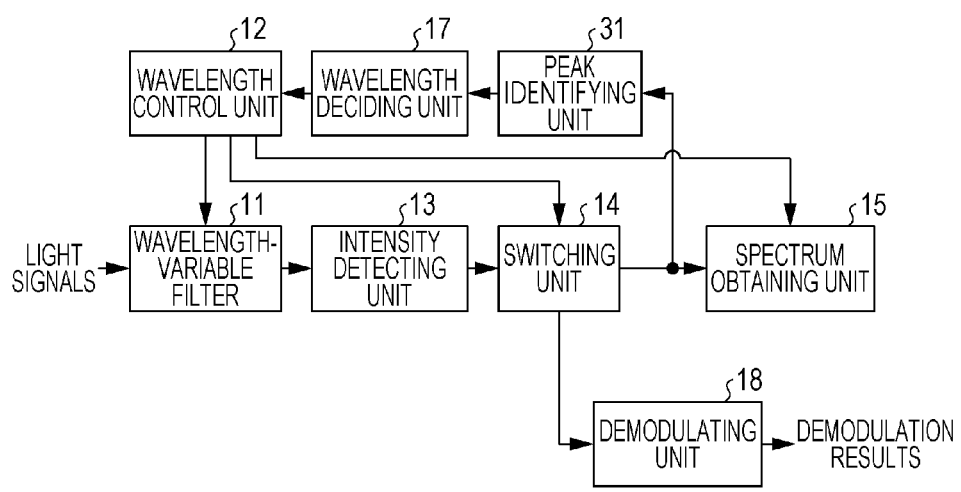
FIG. 5 is a functional block diagram illustrating an example of an optical signal demodulator in a second embodiment.

FIG. 5 is a functional block diagram illustrating an example of an optical signal demodulator in the second embodiment. In FIG. 5, an optical signal demodulator 30 includes a peak identifying unit 31 instead of the peak identifying unit 16 in the first embodiment (FIG. 1). Note that a wavelength control unit 12 illustrated in FIG. 5 does not have to output a completion notification of the sweep processing to the peak identifying unit 31.

Figure 6:
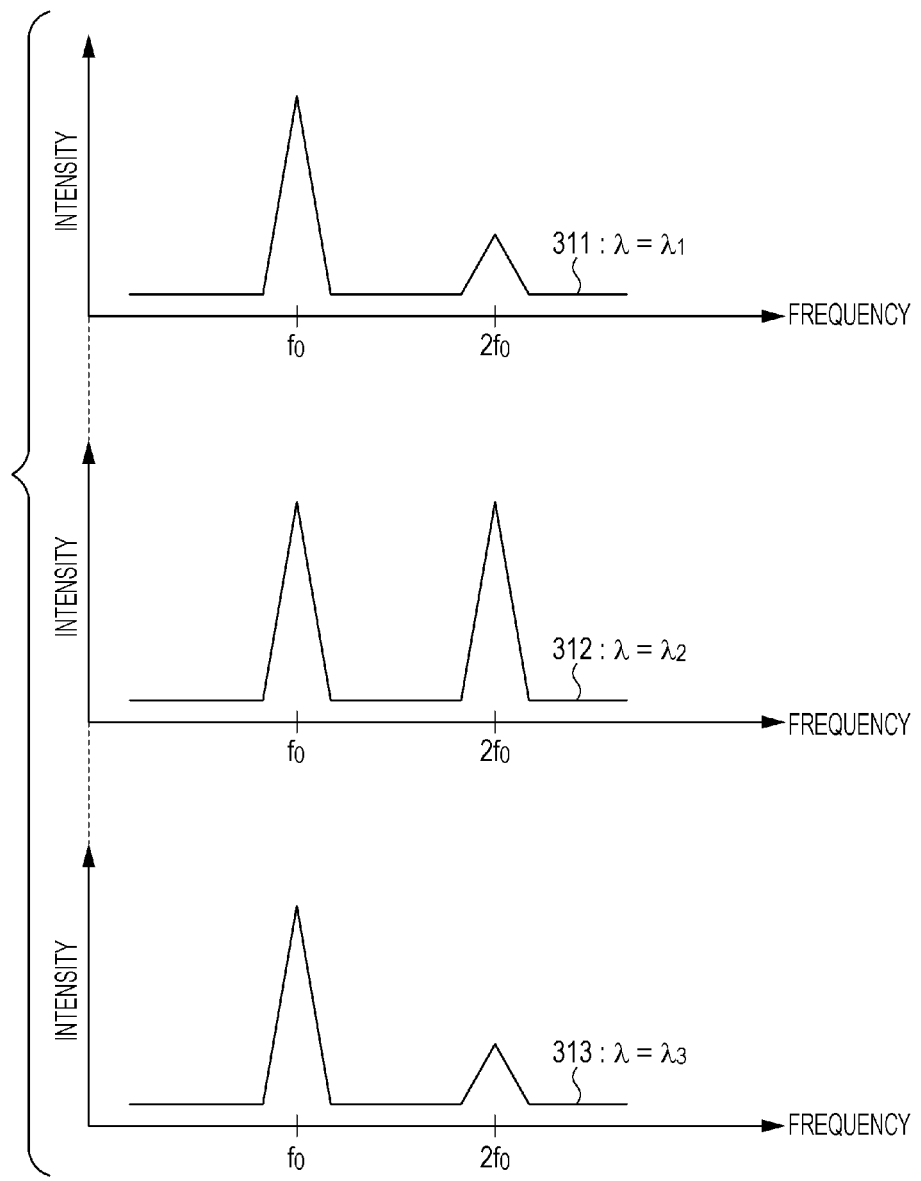
FIG. 6 is a diagram for describing processing of a peak identifying unit in the second embodiment.

Sequentially input to the peak identifying unit 31 is an intensity of the optical signal detected by the intensity detecting unit 13 along with the sweep processing being performed at the wavelength-variable filter 11. The peak identifying unit 31 extracts frequency components from intensities being sequentially input, and observes change in the changing frequency components along with elapse of the sweep processing. This extraction of frequency components is performed using fast Fourier transform (FFT), for example. The peak identifying unit 31 identifies a peak wavelength based on high-harmonic components of the intensities. Specifically, the peak identifying unit 31 identifies a peak wavelength as follows. FIG. 6 is a diagram for describing processing of the peak identifying unit 31 in the second embodiment.

In the event that an optical signal is generated by the auxiliary signal being superimposed on the principal signal by frequency modulation, the peak wavelength agrees with a wavelength whereby a secondary high-harmonic component of an intensity of the optical signal becomes the maximum. Therefore, with Specific Example 1, the peak identifying unit 31 identifies a wavelength whereby the secondary high-harmonic component of an intensity of the optical signal becomes the maximum as a peak wavelength. For example, along with the sweep processing, as illustrated in FIG. 6, let us say that frequency components 311 to 313 of an intensity have been observed at wavelengths of three points of $\lambda_1$ to $\lambda_3$ ($\lambda_1 < \lambda_2 < \lambda_3$), respectively. The peak identifying unit 31 identifies a frequency double a basic frequency $f_0$, that is, a wavelength whereby the intensity becomes the maximum at a secondary high-harmonic $2f_0$ as a peak wavelength. In FIG. 6, for example, of the frequency components 311 to 313 of the intensity, the secondary high-harmonic component becomes the maximum with the frequency component 312. Therefore, the peak identifying unit 31 identifies the wavelength $\lambda_2$ as a peak wavelength.

As illustrated in FIG. 6, frequency components 311 and 313 of two points on both sides of the frequency component 312 whereby the secondary high-harmonic component becomes the maximum are symmetric. In other words, in the event that an optical signal is generated by the auxiliary signal being superimposed on the principal signal by frequency modulation, frequency components of the intensities at the wavelengths of two points on both sides of the peak wavelength are symmetric between two points thereof. Therefore, with Specific Example 2, the peak identifying unit 31 identifies an intermediate point of two points where frequency components of an intensity of the optical signal are symmetric on the wavelength axis as a peak wavelength. For example, in FIG. 6, frequency components of wavelengths of two points, that is, the frequency component 311 of the wavelength $\lambda_1$ and the frequency component 313 of the wavelength $\lambda_3$ are symmetric. Also, for example, let us say that the wavelength $\lambda_2$ is in an intermediate point between the wavelength $\lambda_1$ and wavelength $\lambda_3$. Therefore, the peak identifying unit 31 identifies the wavelength $\lambda_2$ which is an intermediate point between the wavelength $\lambda_1$ and wavelength $\lambda_3$ as a peak wavelength.

Figure 7:
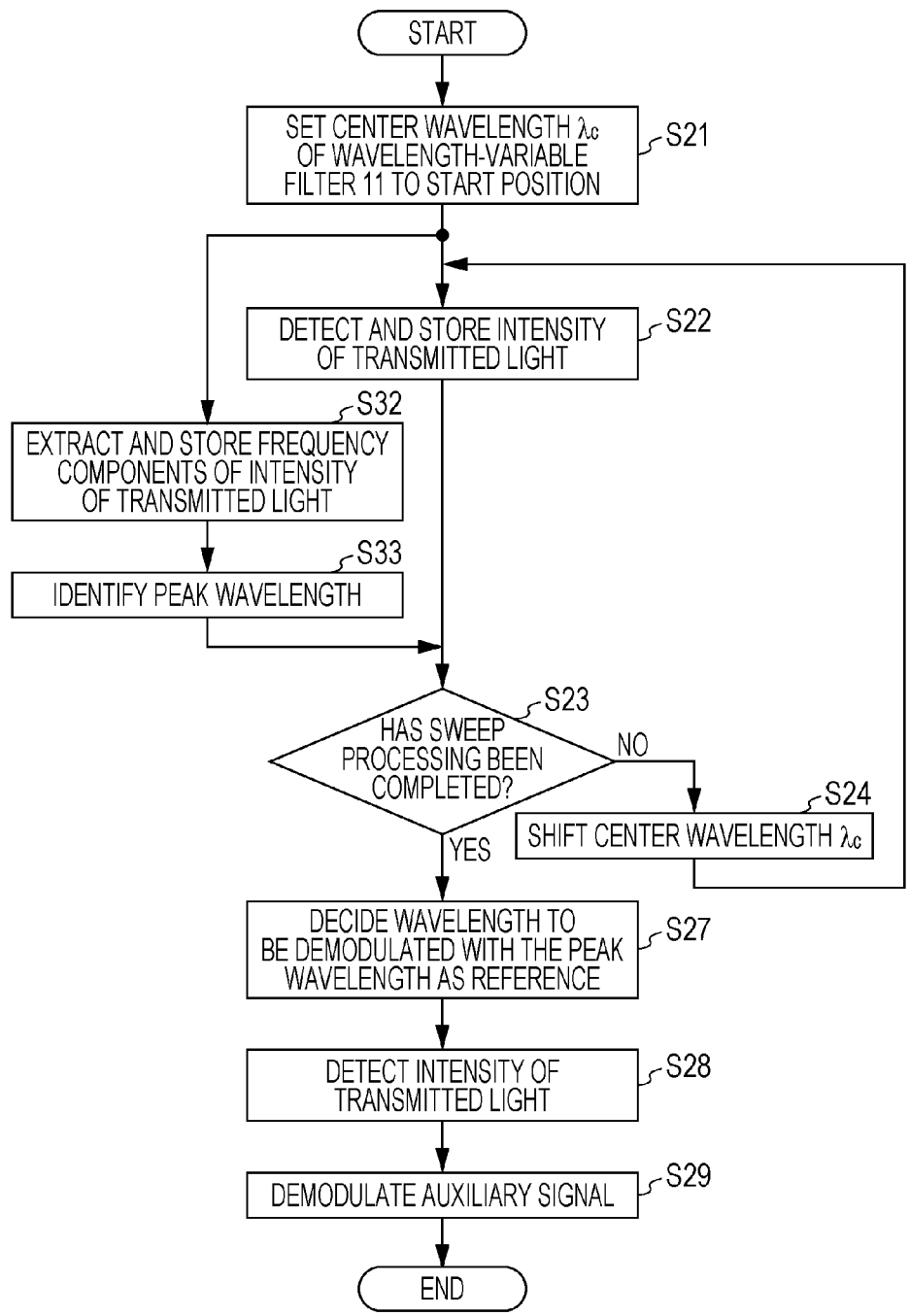
FIG. 7 is a flowchart for describing the processing of the optical signal demodulator in the second embodiment.

FIG. 7 is a flowchart for describing processing of the optical signal demodulator 30 in the second embodiment.

The peak identifying unit 31 extracts and stores frequency components from an intensity of the transmitted light of the wavelength-variable filter 11, and observes change in the changing frequency components along with elapse of the sweep processing (operation S32).

Next, the peak identifying unit 31 identifies a peak wavelength based on high-harmonic components of the intensities, for example, as with Specific Example 1 or Specific Example 2 (operation S33).

As described above, according to the second embodiment, the peak identifying unit 31 identifies a peak wavelength based on frequency components of intensities of the optical signal. Thus, the peak identifying unit 31 may identify a peak wavelength without awaiting completion of the sweep processing of the wavelength-variable filter 11, that is, in the middle of the sweep processing, thereby quickening timing for identifying a peak wavelength as compared to the first embodiment.

With a third embodiment, offset amount from a peak wavelength at the time of deciding the wavelength to be demodulated is calculated based on a spectrum.

Figure 8:
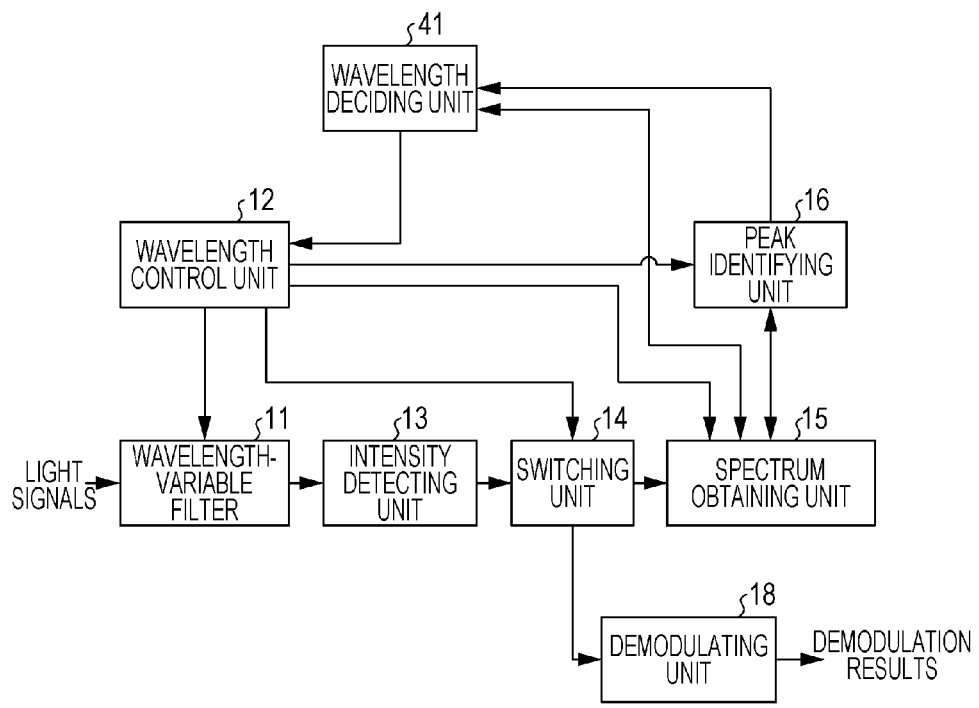
FIG. 8 is a functional block diagram illustrating an example of an optical signal demodulator in a third embodiment.

FIG. 8 is a functional block diagram illustrating an example of an optical signal demodulator in the third embodiment. In FIG. 8, an optical signal demodulator 40 includes a wavelength deciding unit 41 instead of the wavelength deciding unit 17 (FIG. 1) in the first embodiment. Note that, of processing in the wavelength deciding unit 41, other than described below is the same as the processing in the wavelength deciding unit 17 in the first embodiment.

The peak wavelength identified by the peak identifying unit 16 is informed from the peak identifying unit 16 to the wavelength deciding unit 41. Upon the peak wavelength being informed from the peak identifying unit 16, the wavelength deciding unit 41 references the spectrum obtained at the spectrum obtaining unit 15. The wavelength deciding unit 41 then decides the wavelength to be demodulated based on the spectrum with the peak wavelength as a reference.

Figure 9:
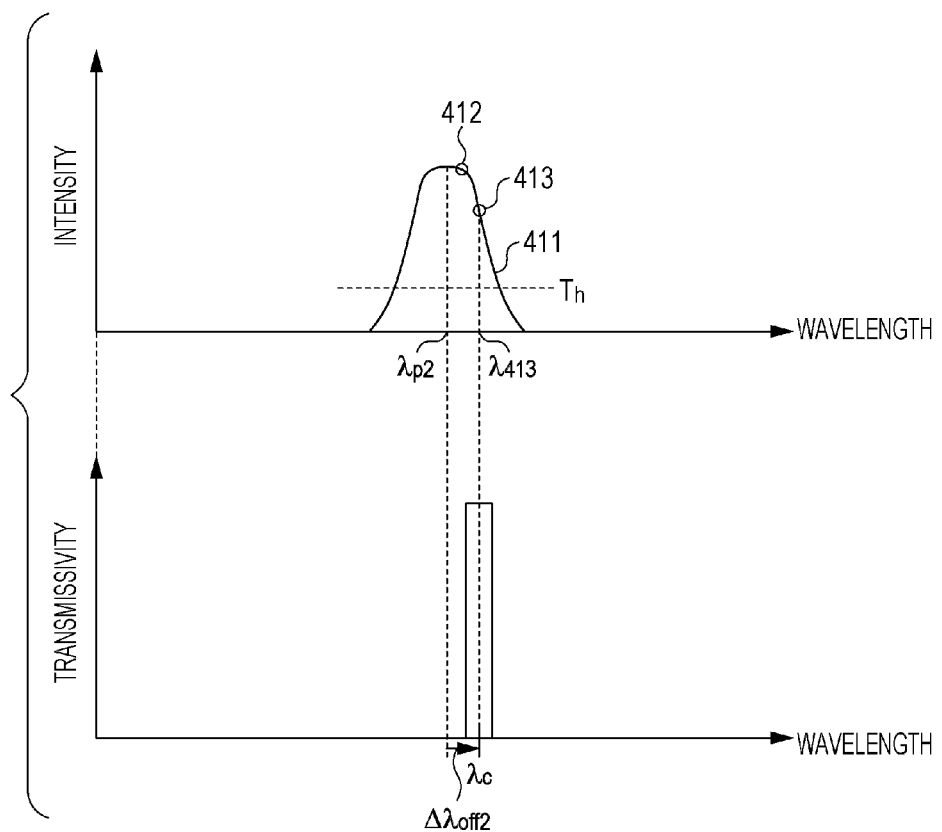
FIG. 9 is a diagram for describing processing of a wavelength deciding unit in the third embodiment.

FIG. 9 is a diagram for describing processing of the wavelength deciding unit 41 in the third embodiment.

In the event of the auxiliary signal being superimposed on the principal signal by frequency modulation, a point where width of change in an intensity of the auxiliary signal converted into an intensity modulated signal as with the first embodiment becomes the maximum is a point where inclination of the spectrum becomes the maximum, that is, a point where a differential coefficient in a spectrum becomes the maximum. For example, as illustrated in FIG. 9, let us say that, with a spectrum 411 of which the peak wavelength is $\lambda_{p2}$, a differential coefficient in a point 413 is greater than a differential coefficient in a point 412, and also, the differential coefficient in the point 413 is the maximum on the spectrum 411. Accordingly, upon the wavelength to be demodulated being decided as a wavelength $\lambda_{413}$ corresponding to the point 413, the width of change in an intensity of the auxiliary signal converted into the intensity modulated signal becomes the maximum.

On the other hand, when deciding a wavelength of which the intensity of the optical signal is too small as the wavelength to be demodulated, there is a possibility that an intensity of the auxiliary signal converted into the intensity modulated signal will not be detected.

Therefore, the wavelength deciding unit 41 decides, as illustrated in FIG. 9, the wavelength $\lambda_{413}$ corresponding to the point 413 where, with the spectrum 411, of intensities equal to or greater than a threshold Th, the differential coefficient becomes the maximum, as the wavelength to be demodulated. Accordingly, the wavelength to be demodulated becomes, as illustrated in FIG. 9, a wavelength "$\lambda_{p2}+\Delta\lambda_{off2}$" that has been offset from the peak wavelength $\lambda_{p2}$ by $+\Delta\lambda_{off2}$ which is offset amount. The wavelength deciding unit 41 outputs the decided wavelength to be demodulated "$\lambda_{p2}+\Delta\lambda_{off2}$" to the wavelength control unit 12.

The wavelength control unit 12 fixes the center wavelength $\lambda_c$ of the wavelength-variable filter 11 to "$\lambda_{p2}+\Delta\lambda_{off2}$" which is the wavelength to be demodulated decided by the wavelength deciding unit 41. The wavelength-variable filter 11 of which the center wavelength $\lambda_c$ has been fixed to the wavelength to be demodulated "$\lambda_{p2}+\Delta\lambda_{off2}$" subjects an optical signal to be input to filtering.

Figure 10:
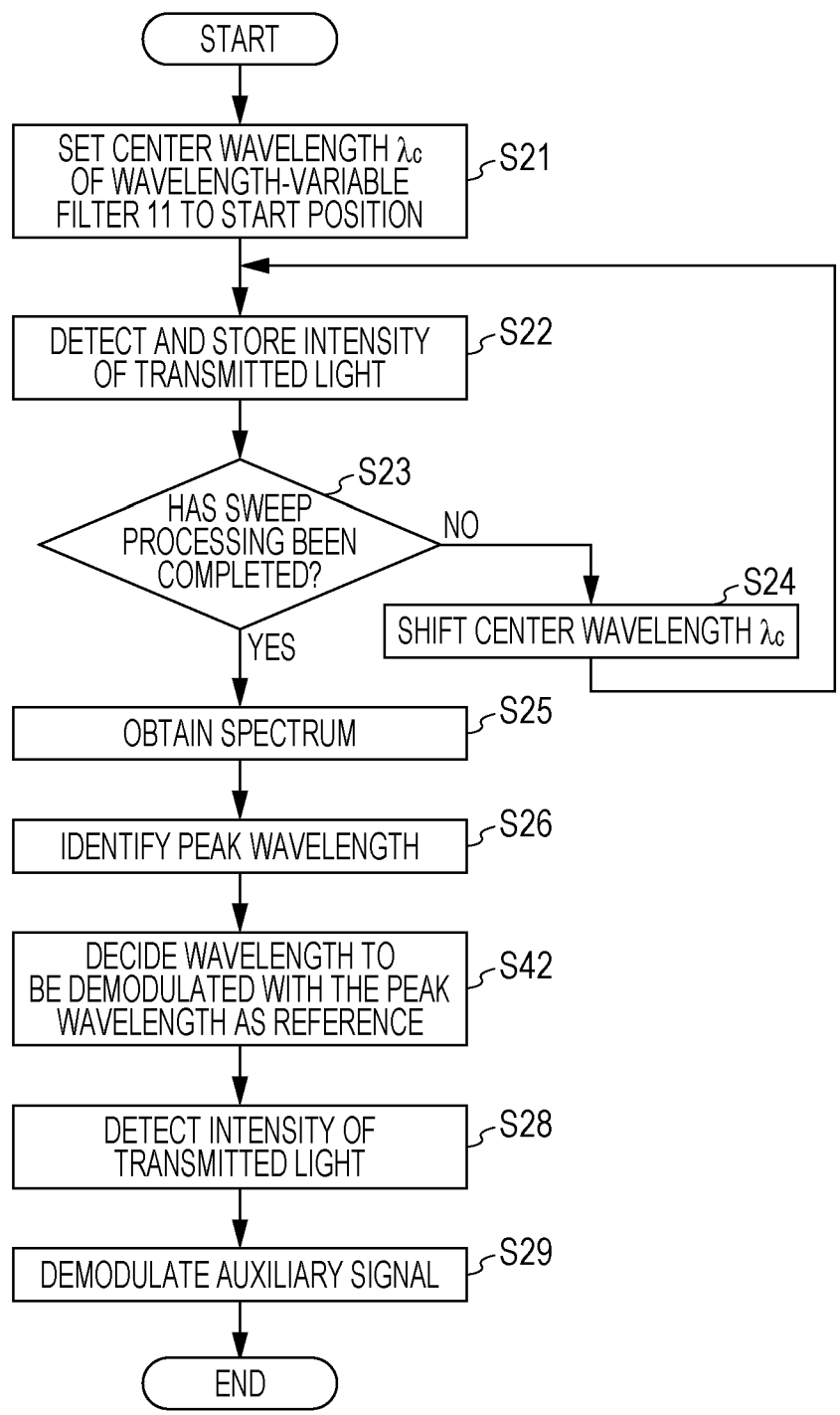
FIG. 10 is a flowchart for describing processing of the optical signal demodulator in the third embodiment.

FIG. 10 is a flowchart for describing processing of the optical signal demodulator 40 in the third embodiment.

The wavelength deciding unit 41 decides the wavelength to be demodulated with the peak wavelength as a reference in accordance with the threshold Th of the intensity of the spectrum, and the differential coefficient of the spectrum, and the wavelength control unit 12 fixes the center wavelength $\lambda_c$ of the wavelength-variable filter 11 to the wavelength to be demodulated (operation S42).

As described above, according to the third embodiment, the wavelength deciding unit 41 decides a wavelength position corresponding to a point where with the spectrum, of intensities equal to or greater than the threshold, the differential coefficient becomes the maximum, as the wavelength to be demodulated. Thus, the width of change in an intensity of the auxiliary signal converted into the intensity modulated signal becomes the maximum, and accordingly, demodulation sensitivity of the auxiliary signal is further improved as compared to the first embodiment.

With a fourth embodiment, intensity detection for demodulating the auxiliary signal is performed along with the sweep processing for obtaining of a spectrum.

Figure 11:
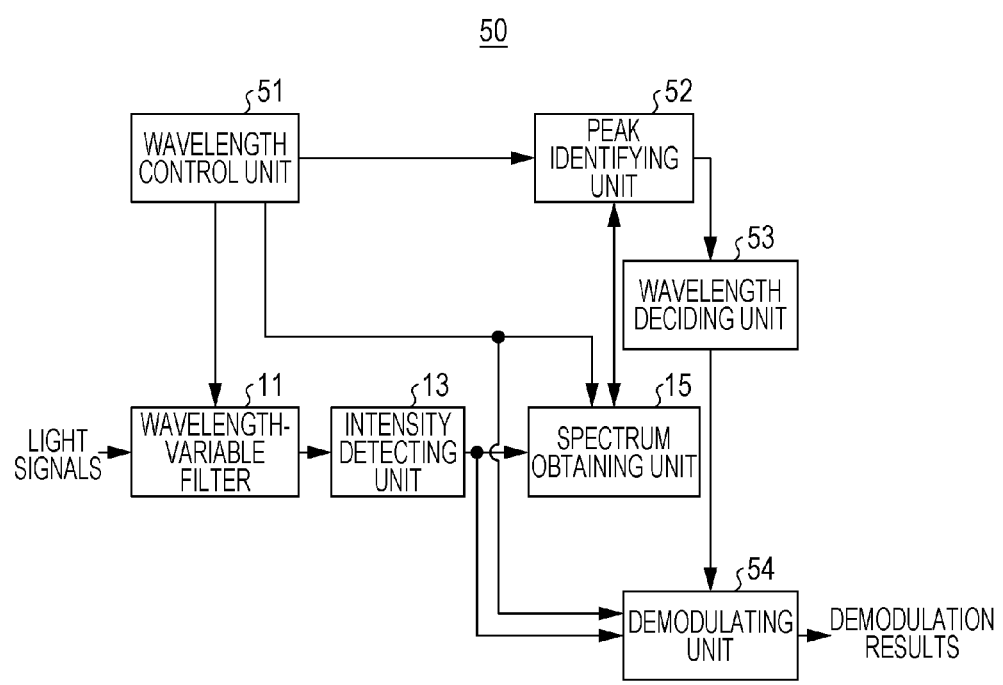
FIG. 11 is a functional block diagram illustrating an example of an optical signal demodulator in a fourth embodiment.

FIG. 11 is a functional block diagram illustrating an example of an optical signal demodulator in the fourth embodiment. In FIG. 11, an optical signal demodulator 50 includes a wavelength control unit 51, a peak identifying unit 52, a wavelength deciding unit 53, and a demodulating unit 54 instead of the wavelength control unit 12, peak identifying unit 16, wavelength deciding unit 17, and demodulating unit 18 (FIG. 1) in the first embodiment. On the other hand, the optical signal demodulator 50 does not include the switching unit 14 (FIG. 1) in the first embodiment.

The wavelength control unit 51 performs the same sweep processing as the sweep processing performed by the wavelength control unit 12 in the first embodiment. Specifically, the wavelength control unit 51 sequentially shifts, in the same way as with the first embodiment, the center wavelength $\lambda_c$ of the wavelength-variable filter 11 with a predetermined wavelength interval, and informs the wavelength of each shift point to the spectrum obtaining unit 15 and demodulating unit 54.

However, the wavelength control unit 51 performs sweep processing at slower speed than the speed of the sweep processing performed by the wavelength control unit 12 in the first embodiment. For example, with the first embodiment, it is enough to obtain a minimum number of intensity detection results whereby a spectrum of the optical signal is obtainable, and accordingly, the wavelength control unit 12 sequentially shifts the center wavelength $\lambda_c$ of the wavelength-variable filter 11 at high speed. For example, the wavelength control unit 12 in the first embodiment performs minimum time sweep processing such that about one intensity detection result is obtained at each point where the center wavelength $\lambda_c$ of the wavelength-variable filter 11 is sequentially shifted. On the other hand, the wavelength control unit 51 performs sweep processing over fixed time such that about 100 intensity detection results are obtained at each point where the center wavelength $\lambda_c$ of the wavelength-variable filter 11 is sequentially shifted. That is to say, the wavelength control unit 51 delays the speed of the sweep processing as compared to the wavelength control unit 12 in the first embodiment. Further, it is desirable for the wavelength control unit 51 to reduce the shift interval of the center wavelength $\lambda_c$ of the wavelength-variable filter 11 as compared to the wavelength control unit 12 in the first embodiment. Thus, with the intensity detecting unit 13, at each point on the wavelength axis, a sufficient number of intensities of the optical signal are detected such that the center wavelength is changed at each point on the wavelength axis by $\pm\Delta\lambda$ along with elapse of time. The intensity detecting unit 13 outputs multiple intensities detected at the shift points on the wavelength axis to the spectrum obtaining unit 15 and demodulating unit 54.

The spectrum obtaining unit 15 stores an intensity first detected at each shift point of multiple intensities detected at the shift points on the wavelength axis in a manner correlated with each shift point. On the other hand, the demodulating unit 54 stores all of the multiple intensities detected at the shifts points on the wavelength axis in a manner correlated with each shift point.

The wavelength control unit 51 outputs, after completion of the sweep processing, a completion notification of the sweep processing to the peak identifying unit 52 as a start instruction of peak identifying processing.

Upon receiving the completion notification of the sweep processing from the wavelength control unit 51, the peak identifying unit 52 identifies a peak wavelength in the same way as with the first embodiment, and informs the identified peak wavelength to the wavelength deciding unit 53.

Upon receiving a notification of the peak wavelength from the peak identifying unit 52, the wavelength deciding unit 53 decides the wavelength to be demodulated with the informed peak wavelength as a reference, and informs the decided wavelength to be demodulated to the demodulating unit 54. The wavelength deciding unit 53 decides a wavelength position that has been offset from the peak wavelength by predetermined amount as the wavelength to be demodulated with the peak wavelength as a reference.

The demodulating unit 54 demodulates the auxiliary signal based on multiple intensities restricted to the wavelength to be demodulated of intensities detected along with the sweep processing and stored in the demodulating unit 54.

Here, intensities detected by the intensity detecting unit 13 are multiple intensities detected at the points where the center wavelength $\lambda_c$ of the wavelength-variable filter 11 has sequentially been shifted. Therefore, the multiple intensities for each shift point are, in the same way as with the first embodiment (FIG. 3), the intensity pw1 or intensity pw2 greater than the intensity pw1. In this manner, the auxiliary signal superimposed on the principal signal by frequency modulation of $\pm\Delta f$ is, along with the sweep processing, by the filtering at the wavelength-variable filter 11, detected as a signal of which the intensity is changed by the worth according to $\pm\Delta f$. Therefore, the demodulating unit 54 demodulates, in the same way as with the first embodiment, the auxiliary signal with the intensity pw1 as information of "0" and with the intensity pw2 as information of "1", and outputs the demodulation result.

Figure 12:
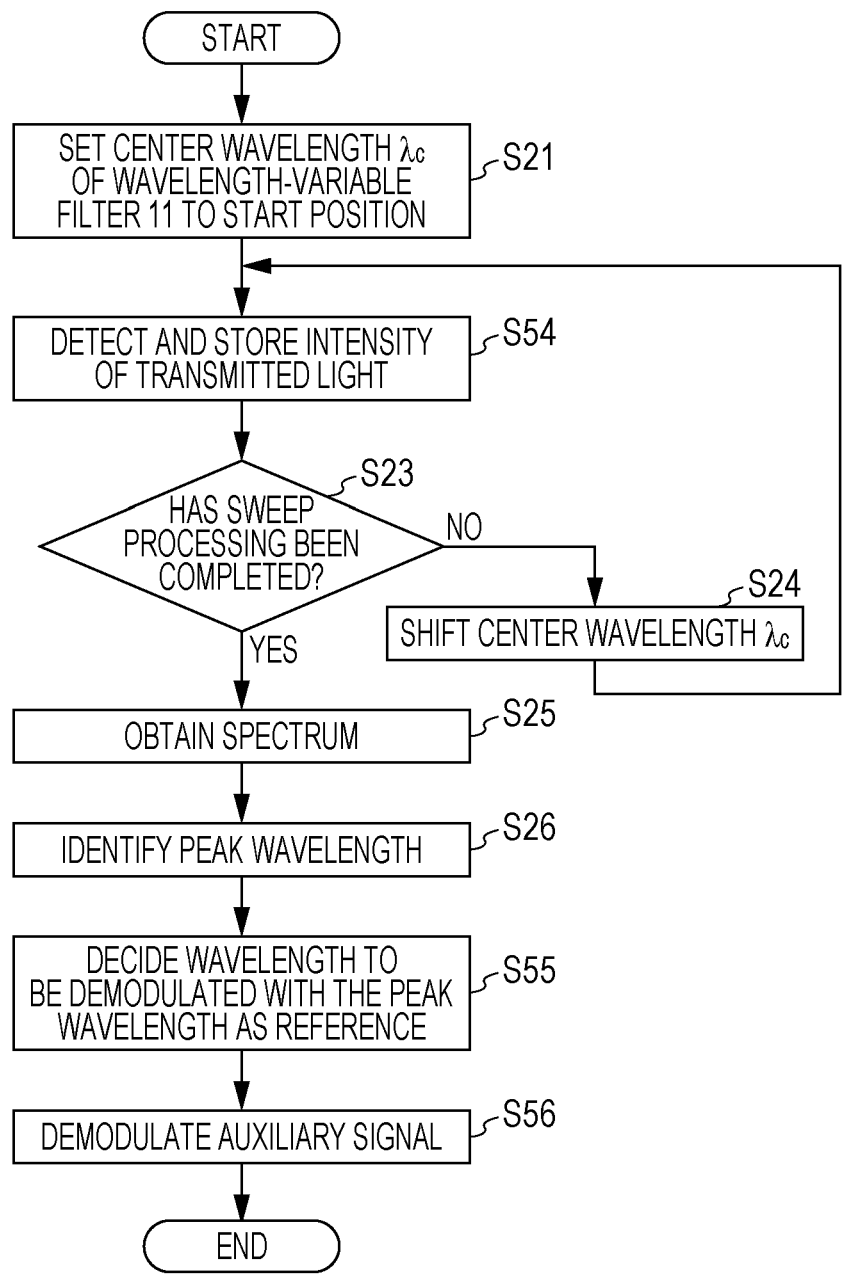
FIG. 12 is a flowchart for describing processing of the optical signal demodulator in the fourth embodiment.

FIG. 12 is a flowchart for describing processing of the optical signal demodulator 50 in the fourth embodiment.

With a processing loop in operation S54 to operation S24, the intensity detecting unit 13 detects an intensity of the transmitted light of the wavelength-variable filter 11, and the spectrum obtaining unit 15 and demodulating unit 54 store the intensity detected by the intensity detecting unit 13 (operation S54).

Upon the peak wavelength being identified by the peak identifying unit 52 (operation S26), the wavelength deciding unit 53 decides the wavelength to be demodulated with the peak wavelength as a reference (operation S55).

Next, the demodulating unit 54 demodulates the auxiliary signal based on multiple intensities restricted to the wavelength to be demodulated of the intensities stored in operation S54 (operation S56).

As described above, according to the fourth embodiment, with the optical signal demodulator 50, the spectrum obtaining unit 15 obtains a spectrum of the optical signal generated by the auxiliary signal being superimposed on the principal signal by frequency modulation. The peak identifying unit 52 identifies a peak wavelength which is a wavelength corresponding to a peak position of the spectrum obtained by the spectrum obtaining unit 15, on the wavelength axis. The wavelength deciding unit 53 decides the wavelength to be demodulated with the peak wavelength identified by the peak identifying unit 52 as a reference. The demodulating unit 54 demodulates the auxiliary signal with the wavelength to be demodulated of the optical signal decided by the wavelength deciding unit 53 with the peak wavelength identified by the peak identifying unit 52 as a reference. Thus, in the same way as with the first embodiment, in order to decide the optimal wavelength position as the wavelength to be demodulated, demodulation precision of the auxiliary signal superimposed on the principal signal by frequency modulation is improved. Also, even when the nominal wavelength of the principal signal is unknown, the demodulating unit 54 demodulates the auxiliary signal.

Also, the intensity detecting unit 13 detects an intensity of the transmitted light of the wavelength-variable filter 11. The wavelength control unit 51 performs sweep processing wherein the transmitted wavelength band of the wavelength-variable filter 11 is swept on the wavelength axis to have the spectrum obtaining unit 15 obtain a vector. The demodulating unit 54 demodulates the auxiliary signal based on some intensities of the wavelength to be demodulated of multiple intensities detected by the intensity detecting unit 13 according to the sweep processing. In short, with the fourth embodiment, intensity detection for demodulating the auxiliary signal is performed along with the sweep processing for obtaining a spectrum. That is to say, intensity detection for demodulating the auxiliary signal, and intensity detection for obtaining a spectrum are performed together at one-time sweep processing. Therefore, in the event of implementing the fourth embodiment by combining an existing optical channel monitor and optical signal demodulator 50, when delaying the speed of the sweep processing, it takes time to obtain a spectrum for the optical channel monitor. On the other hand, the optical channel monitor intends to obtain intensities across the entire area of the transmission wavelength band of the optical signal as soon as possible, and accordingly, time taken for the sweep processing for detecting an intensity for demodulating the auxiliary signal is restricted. Now, in the event that information volume for the auxiliary signal is relatively small, time taken for detecting multiple intensities at each point where the center wavelength $\lambda_c$ of the wavelength-variable filter 11 is sequentially shifted is suppressed in a small amount of time. Also, when time taken for detecting multiple intensities at each point where the center wavelength $\lambda_c$ of the wavelength-variable filter 11 is sequentially shifted is suppressed in a small amount of time, the optical channel monitor may obtain intensities across the entire area of the transmission wavelength band of the optical signal in a relatively small amount of time from start of the sweep processing. Accordingly, the fourth embodiment is an embodiment advantageous to a case where information volume of the auxiliary signal is relatively small.

Also, with the fourth embodiment, intensity detection for demodulating the auxiliary signal is performed along with the sweep processing for obtaining a spectrum, and accordingly, as with the first embodiment, after completion of the sweep processing, processing for moving the center wavelength of the wavelength-variable filter 11 to the wavelength to be demodulated and fixing thereto is further omissible. Therefore, the wavelength control unit 51 does not perform control of the center wavelength of the wavelength-variable filter 11 to detect an intensity for demodulating the auxiliary signal after completion of the sweep processing. Therefore, according to the fourth embodiment, processing volume used for control of the center wavelength of the wavelength-variable filter 11 is reduced as compared to the first embodiment.

Note that, in order to suppress obtaining of a spectrum for the optical channel monitor in a small amount of time, as compared to time for the sweep processing in the first embodiment, the sweep processing may be performed with time equivalent thereto, or with slightly slower time. In this case, the demodulating unit 54 stores all of intensities detected by the intensity detecting unit 13 along with the sweep processing. The demodulating unit 54 then extracts modulated components according to frequency modulation from the intensities restricted to the wavelength to be demodulated of the intensities detected along with the sweep processing using signal processing, and demodulates the auxiliary signal thereby. In short, in this case as well, the demodulating unit 54 demodulates the auxiliary signal based on some intensities of the wavelength to be demodulated of multiple intensities detected by the intensity detecting unit 13 according to the sweep processing. In this manner, as compared to time for the sweep processing in the first embodiment, the sweep processing may be performed with time equivalent thereto, or with slightly slower time, thereby performing obtaining of a spectrum for the optical channel monitor in a small amount of time.

Figure 13:
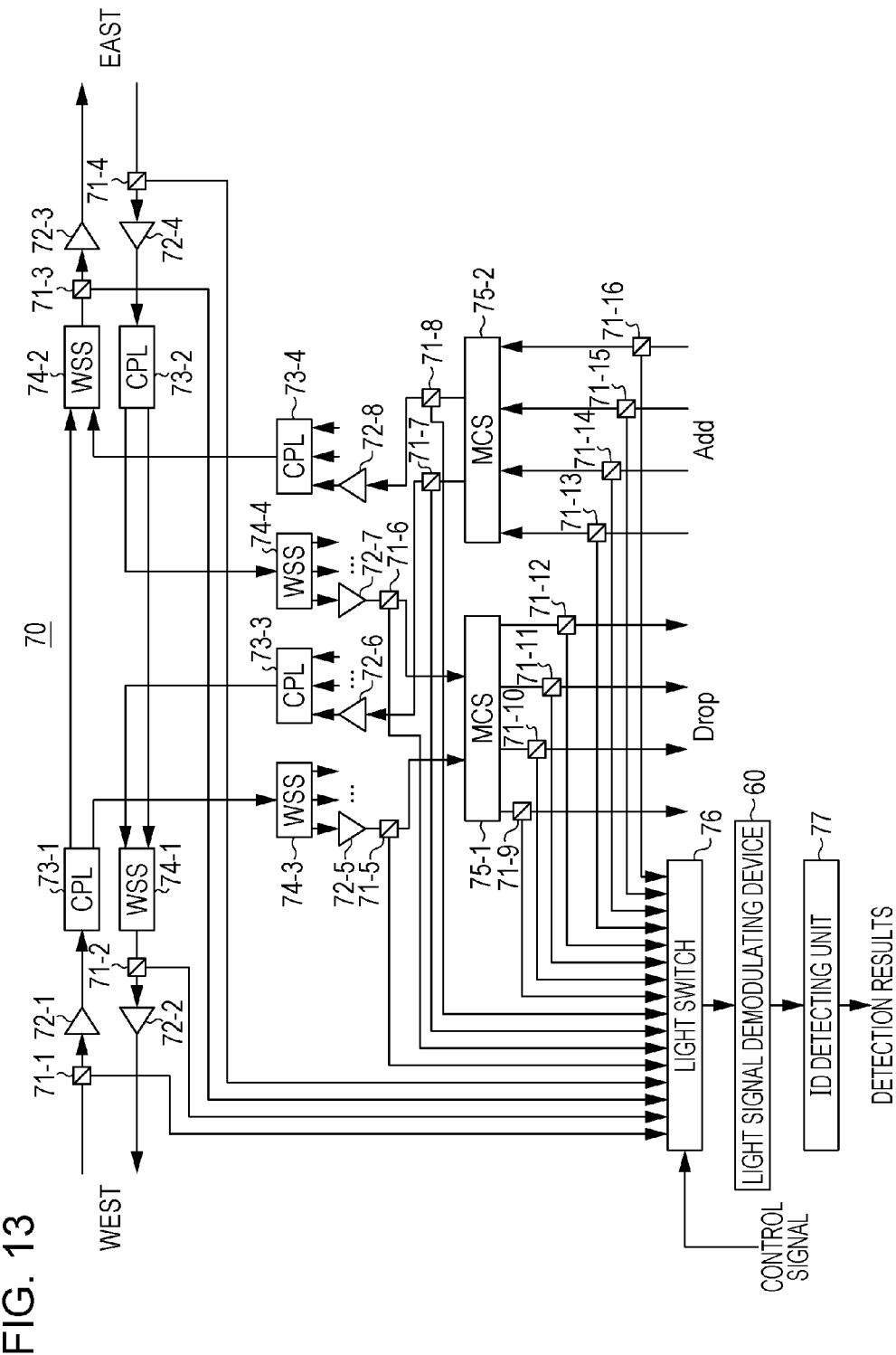
FIG. 13 is a functional block diagram illustrating an example of an optical add-drop multiplexer in a fifth embodiment.

With a fifth embodiment, description will be made regarding an optical add-drop multiplexer to which the optical signal demodulators in the embodiments (first to fourth embodiments) have been applied. FIG. 13 is a functional block diagram illustrating an example of an optical add-drop multiplexer in the fifth embodiment. In FIG. 13, an optical add-drop multiplexer called an optical add/drop multiplexer (OADM) 70 includes optical couplers 71-1 to 71-16, optical amplifiers 72-1 to 72-8, and optical couplers 73-1 to 73-4. Also, the optical add-drop multiplexer 70 includes wavelength selectable switches (WSS) 74-1 to 74-4, and multicast switches (MCS) 75-1 and 75-2. Also, the optical add-drop multiplexer 70 includes an optical switch 75, an optical signal demodulator 60, and an ID detecting unit 76.

The optical add-drop multiplexer 70 is disposed at a branching point on a ring optical network, for example. The optical add-drop multiplexer 70 transmits an optical signal obtained by multiple optical signals having a mutually different wavelength being multiplexed by WDM (hereinafter, may be referred to as "WDM signal") from WEST side to EAST side of the optical network, or from EAST side to WEST side.

The optical couplers 71-1 to 71-16 and optical couplers 73-1 to 73-4 branch one input optical signal into multiple routes and output these, or combine multiple input optical signals and output this.

The optical amplifiers 72-1 to 72-8 amplify intensity of input optical signals.

The wavelength selectable switches 74-3 and 74-4 select an optical signal having a desired wavelength from the input WDM signal, and output this. The wavelength selectable switches 74-1 and 74-2 output a WDM signal obtained by inserting the optical signals output from the couplers 73-3 and 73-4 into a desired optical signal selected from the input WDM signal.

The multicast switches 75-1 and 75-2 have multiple input ports and multiple output ports. The multicast switches 75-1 and 75-2 output an optical signal input to a particular input port to a particular output port by changing a connection state of an input port and an output port between the multiple input ports and multiple output ports. An optical signal output to Drop side from the multicast switch 75-1 is input to a transponder (not illustrated). Also, with the multicast switch 75-2, an optical signal output from the transponder (not illustrated) is input from Add side.

The optical switch 76 outputs, of optical signals input from the optical couplers 71-1 to 71-16, only an optical signal instructed by a control signal to the optical signal demodulator 60.

The optical signal demodulator 60 is one of the optical signal demodulators 10, 30, 40, and 50.

The ID detecting unit 77 to which demodulation results at the optical signal demodulator 60 are input detects a node ID or path ID included in the auxiliary signal from the demodulation results thereof.

Hereinafter, as an example, description will be made regarding a case where the optical add-drop multiplexer 70 receives the WDM signal transmitted from WEST side. Also, each optical signal multiplexed in the WDM signal includes the principal signal and the auxiliary signal superimposed on the principal signal by frequency modulation. Also, let us say that three principal signals with wavelengths $\lambda_1$, $\lambda_2$, and $\lambda_3$ have been multiplexed in the WDM signal, the auxiliary signals include a node ID, and the principal signal with the wavelength $\lambda_2$ is selected from the WDM signal and output to the optical amplifier 72-5 by the wavelength selectable switch 74-3. Also, let us say that, with the multicast switch 75-1, the principal signal with the wavelength $\lambda_2$ input to an input port connected to the optical coupler 71-5 is output to an output port connected to the optical coupler 71-9.

First, the optical switch 76 is controlled by a control signal so as to select an input WDM signal from the optical coupler 71-1. The WDM signal input from WEST side is branched to the optical switch 76 and optical amplifier 72-1 by the optical coupler 71-1. The optical switch 76 outputs the input WDM signal to the optical signal demodulator 60. The optical signal demodulator 60 obtains, as with the above embodiments, a spectrum of the WDM signal, and identifies a peak of the obtained spectrum. In the event that three principal signals with wavelengths $\lambda_1$, $\lambda_2$, and $\lambda_3$ have been multiplexed in the WDM signal, the optical signal demodulator 60 identifies peak wavelengths $\lambda_{p1}$, $\lambda_{p2}$, and $\lambda_{p3}$ of the three principal signals with wavelengths $\lambda_1$, $\lambda_2$, and $\lambda_3$, respectively. The optical signal demodulator 60 then demodulates, as with the above embodiments, three auxiliary signals superimposed on the three principal signals with wavelengths $\lambda_1$, $\lambda_2$, and $\lambda_3$, respectively, and outputs the three demodulation results to the ID detecting unit 77. The ID detecting unit 77 detects the path ID of each of the three principal signals with wavelengths $\lambda_1$, $\lambda_2$, and $\lambda_3$ from the bit strings which are these demodulation results, and outputs the detection results. In this manner, first, multiple path IDs are detected from the WDM signal.

Next, the optical switch 76 is controlled by a control signal so as to select input optical signals from the optical couplers 71-5 and 71-9. Accordingly, optical signals are input from both of the optical couplers 71-5 and 71-9 to the optical signal demodulator 60. The optical signal demodulator 60 demodulates, as with the embodiments, the auxiliary signal, and outputs the demodulation result to the ID detecting unit 77. Accordingly, in the event that the wavelength selectable switch 74-3 operates normally, a path ID of the principal signal with wavelength $\lambda_2$ is detected from the optical signal output from the optical coupler 71-5. In short, in the event that the wavelength selectable switch 74-3 operates normally, a path ID detected from the optical signal output from the optical coupler 71-5 corresponds to one of the multiple path IDs detected from the WDM signal. Similarly, in the event that the multicast switch 75-1 operates normally, a path ID of the principal signal with wavelength $\lambda_2$ is detected from the optical signal output from the optical coupler 71-9. In short, in the event that the multicast switch 75-1 operates normally, a path ID detected from the optical signal output from the optical coupler 71-9 corresponds to one of the multiple path IDs detected from the WDM signal. On the other hand, in the event that the wavelength selectable switch 74-3 is not in a normal operation state, there is a high possibility that a path ID detected from the optical signal output from the optical coupler 71-5 corresponds to none of the multiple path IDs detected from the WDM signal. Similarly, in the event that the multicast switch 75-1 is not in a normal operation state, there is a high possibility that a path ID detected from the optical signal output from the optical coupler 71-9 corresponds to none of the multiple path IDs detected from the WDM signal.

Accordingly, determination may be made regarding whether the operation state of the wavelength selectable switch 74-3 is normal or abnormal by comparing the multiple path IDs detected from the WDM signal with the path ID detected from the optical signal output from the optical coupler 71-5. Similarly, determination may be made regarding whether the operation state of the multicast switch 75-1 is normal or abnormal by comparing the multiple path IDs detected from the WDM signal with the path ID detected from the optical signal output from the optical coupler 71-9.

As described above, according to the fifth embodiment, the optical add-drop multiplexer 70 includes the optical signal demodulator 60. The optical signal demodulator 60 is one of the optical signal demodulators 10, 30, 40, and 50 (first embodiment to fourth embodiment). Therefore, according to the fifth embodiment, with the optical add-drop multiplexer, the same advantages as the advantages of the first to fourth embodiments are obtained.

The second embodiment and third embodiment may also be implemented being combined. Also, the fourth embodiment may also be combined with the second embodiment and third embodiment.

The above-mentioned "auxiliary signal" may include various types of information for management of an optical network in addition to a node ID or path ID. For example, information indicating a modulation scheme used for the principal signal, information indicating an optical signal noise ratio (OSNR) in an established optical path, information indicating wavelength dispersion, and so forth may be included in the auxiliary signal.

The above-mentioned "principal signal" may be any signal as long as this signal is a signal on which some signal is superimposed, and accordingly, the appellation of a signal on which the auxiliary signal is superimposed is not restricted to "principal signal". Similarly, the above-mentioned "auxiliary signal" may be any signal as long as this signal is a signal to be superimposed on some signal, and accordingly, the appellation of a signal to be superimposed on the principal signal is not restricted to "auxiliary signal". For example, "auxiliary signal" is sometimes used for management of an optical network, and accordingly sometimes referred to as "management signal". In short, with the disclosed technology, from an optical signal generated by the other signal being superimposed on one of two signals by frequency modulation, at least the other signal may be demodulated.

Figure 14:
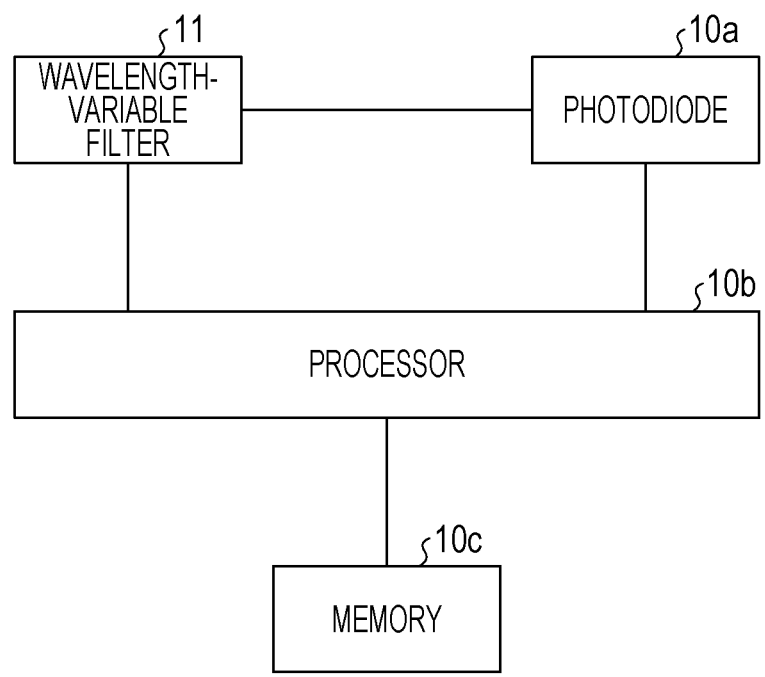
FIG. 14 is a diagram illustrating a hardware configuration example of an optical signal demodulator.

The above-mentioned optical signal demodulators 10, 30, 40, and 50 are realized by the following hardware configuration. FIG. 14 is a diagram illustrating a hardware configuration example of an optical signal demodulator. As illustrated in FIG. 14, the optical signal demodulators 10, 30, 40, and 50 includes, as hardware components, a wavelength-variable filter 11, a photodiode 10$a$, a processor 10$b$, and memory 10$c$. Examples of the processor 10$b$ include a central processing unit (CPU), a digital signal processor (DSP), and a field programmable gate array (FPGA). Also, the optical signal demodulators 10, 30, 40, and 50 may include a large scale integrated circuit (LSI) including the processor 10$b$ and a peripheral circuit. Examples of the memory 10$c$ include RAM such as synchronous dynamic random access memory (SDRAM), read-only memory (ROM), and flash memory. The intensity detecting unit 13 is realized by the photodiode 10$a$. The wavelength control units 12 and 51, switching unit 14, peak identifying units 16, 31, and 52, wavelength deciding units 17, 41, and 53, and demodulating unit 18 are realized by the processor 10$b$. The spectrum obtaining unit 15 and demodulating unit 54 are realized by the processor 10$b$ and memory 10$c$.

Various types of processing in the above description may be realized by causing the processor 10$b$ to execute a program prepared beforehand. For example, there is stored in the memory 10$c$ beforehand a program corresponding to each process to be executed by the wavelength control units 12 and 51, switching unit 14, peak identifying units 16, 31, and 52, wavelength deciding units 17, 41, and 53, and demodulating units 18 and 54. Each program may serve as a process by being read out from the memory 10$c$ to the processor 10$b$.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical signal demodulator, comprising:
   a wavelength-variable filter, having a transmitted wavelength band, configured to filter an optical signal generated by a second signal being superimposed on a first signal using frequency modulation;
   an obtaining unit configured to obtain a spectrum of the optical signal having been filtered by the wavelength-variable filter;
   an identifying unit configured to identify a peak wavelength which is a wavelength corresponding to a peak position of the spectrum obtained by the obtaining unit; and
   a demodulating unit configured to demodulate the second signal from the optical signal filtered by the wavelength-variable filter with the transmitted wavelength band having been set based on the peak wavelength identified by the identifying unit.

2. The optical signal demodulator according to claim 1, further comprising:
   a detecting unit configured to detect an intensity of the optical signal filtered by the wavelength-variable filter; and
   a wavelength control unit configured to
      perform sweep processing to sweep the transmitted wavelength band of the wavelength-variable filter as the optical signal is being filtered by the wavelength-variable filter, and,
      after completion of the sweep processing,
         control the obtaining unit to obtain the spectrum from the intensity detected by the detecting unit, and
         control the transmitted wavelength band of the wavelength-variable filter based on the peak wavelength identified by the identifying unit,
   wherein the demodulating unit demodulates the second signal based on the intensity detected by the detecting unit.

3. An optical signal demodulator, comprising:
   a wavelength-variable filter, having a transmitted wavelength band, configured to filter an optical signal with the transmitted wavelength band being swept, the optical signal generated by a second signal being superimposed on a first signal using frequency modulation;
   a detecting unit configured to detect an intensity of the optical signal filtered by the wavelength-variable filter with the transmitted wavelength band being swept;
   an obtaining unit configured to, after the transmitted wavelength band has been swept, obtain a spectrum of the optical signal based on the intensity detected by the detecting unit;
   an identifying unit configured to identify a peak wavelength which is a wavelength corresponding to a peak position of the spectrum obtained by the obtaining unit; and
   a demodulating unit configured to demodulate the second signal based on an intensity of a specific wavelength that has been set with the peak wavelength of the intensity detected by the detecting unit according to the sweeping of the transmitted wavelength band as a reference.

4. The optical signal demodulator according to claim 3, wherein the identifying unit identifies a wavelength with a secondary high-harmonic component of the intensity of the optical signal exhibiting a maximum, as the peak wavelength.

5. The optical signal demodulator according to claim 3, wherein the identifying unit identifies an intermediate point of two points where frequency components of the intensity of the optical signal exhibit symmetry, as the peak wavelength.

6. The optical signal demodulator according to claim 3, further comprising:
a set-up unit configured to set the transmitted wavelength band to a wavelength position offset from the peak wavelength.

7. The optical signal demodulator according to claim 6, further comprising:
a set-up unit configured to set the transmitted wavelength band to the wavelength position corresponding to a point with a differential coefficient of intensities equal to or higher than a threshold in the spectrum exhibiting the maximum.

8. An optical add-drop multiplexer, comprising:
a wavelength-variable filter, having a transmitted wavelength band, configured to filter an optical signal received by the optical add-drop multiplexer and generated by a second signal being superimposed on a first signal using frequency modulation;
an obtaining unit configured to obtain a spectrum of the optical signal having been filtered by the wavelength-variable filter;
an identifying unit configured to identify a peak wavelength which is a wavelength corresponding to a peak position of the spectrum obtained by the obtaining unit; and
a demodulating unit configured to demodulate the second signal from the optical signal filtered by the wavelength-variable filter with the transmitted wavelength band having been set based on the peak wavelength identified by the identifying unit.

9. An optical signal demodulating method, comprising:
filtering, using a wavelength-variable filter having a transmitted wavelength band, an optical signal generated by a second signal being superimposed on a first signal using frequency modulation;
obtaining a spectrum of the optical signal filtered by said filtering;
identifying a peak wavelength which is a wavelength corresponding to a peak position of the spectrum obtained by said obtaining; and
demodulating the second signal from the optical signal filtered by said filtering with the transmitted wavelength band having been set based on the peak wavelength identified by said identifying.

10. An optical signal demodulator, comprising:
memory storing instructions; and
a processor;
wherein the processor configured to execute the instructions to:
cause an optical signal to be filtered by a wavelength-variable filter having a transmitted wavelength band, the optical signal generated by a second signal being superimposed on a first signal using frequency modulation;
obtain a spectrum of the optical signal filtered by the wavelength-variable filter,
determine a peak wavelength which is a wavelength corresponding to a peak position of the obtained spectrum, and
demodulate the second signal from the optical signal filtered by the wavelength-variable filter with the transmitted wavelength band having been set based on the determined peak wavelength.

11. The optical signal demodulator according to claim 1, further comprising:
a wavelength deciding unit configured to decide a wavelength of the second signal to be demodulated based on the peak wavelength identified by the identifying unit, and thereby provide a decision result; and
a wavelength control unit configured to control the variable-wavelength filter so that the transmitted wavelength band of the variable-wavelength filter is set based on the decision result provided by the wavelength deciding unit, and so that the demodulating unit thereby demodulates the second signal from the optical signal.

12. The optical signal demodulator according to claim 3, further comprising:
a wavelength deciding unit configured to decide a wavelength of the second signal to be demodulated based on the peak wavelength identified by the identifying unit, and thereby provide a decision result; and
a wavelength control unit configured to control the variable-wavelength filter so that the transmitted wavelength band of the variable-wavelength filter is set based on the decision result provided by the wavelength deciding unit, and so that the demodulating unit thereby demodulates the second signal from the optical signal.

13. The optical add-drop multiplexer according to claim 8, further comprising:
a wavelength deciding unit configured to decide a wavelength of the second signal to be demodulated based on the peak wavelength identified by the identifying unit, and thereby provide a decision result; and
a wavelength control unit configured to control the variable-wavelength filter so that the transmitted wavelength band of the variable-wavelength filter is set based on the decision result provided by the wavelength deciding unit, and so that the demodulating unit thereby demodulates the second signal from the optical signal.

14. The optical signal demodulating method according to claim 9, further comprising:
deciding a wavelength of the second signal to be demodulated based on the peak wavelength identified by said identifying, and thereby providing a decision result; and
controlling the variable-wavelength filter so that the transmitted wavelength band of the variable-wavelength filter is set based on the decision result provided by said deciding, and so that said demodulating thereby demodulates the second signal from the optical signal.

15. The optical signal demodulator according to claim 10, wherein the processor is further configured to execute the instructions to:
decide a wavelength of the second signal to be demodulated based on the determined peak wavelength, and thereby providing a decision result; and
control the variable-wavelength filter so that the transmitted wavelength band of the variable-wavelength filter is set based on the decision result.

* * * * *